No. 897,137. PATENTED AUG. 25, 1908.
O. S. PERKINS, DEC'D.
A. D. WARD, EXECUTOR.
COMBINATION TOY AND EDUCATIONAL BLOCK.
APPLICATION FILED FEB. 9, 1906.

WITNESSES:

INVENTOR
Orlando S. Perkins
By
Attorney

UNITED STATES PATENT OFFICE.

ORLANDOW S. PERKINS, OF NEWBERN, NORTH CAROLINA; ALFRED D. WARD EXECUTOR OF SAID PERKINS, DECEASED.

COMBINATION TOY AND EDUCATIONAL BLOCK.

No. 897,137.　　　Specification of Letters Patent.　　　Patented Aug. 25, 1908.

Application filed February 9, 1906. Serial No. 300,279.

*To all whom it may concern:*

Be it known that I, ORLANDOW S. PERKINS, citizen of the United States, residing at Newbern, in the county of Craven and State of North Carolina, have invented certain new and useful Improvements in a Combination Toy and Educational Block, of which the following is a specification.

This invention relates to a combined toy and educational block, and pertains especially to spinning-top having a multiple of surfaces bearing the whole alphabet and numerals equal in number to the alphabet.

The object of the invention is to provide a combination toy and educational block having faces and surfaces at an angle to each other peculiarly arranged, and bearing letters constituting the alphabet and numerals accompanying the letters equal in number to the alphabet.

Figure 1:
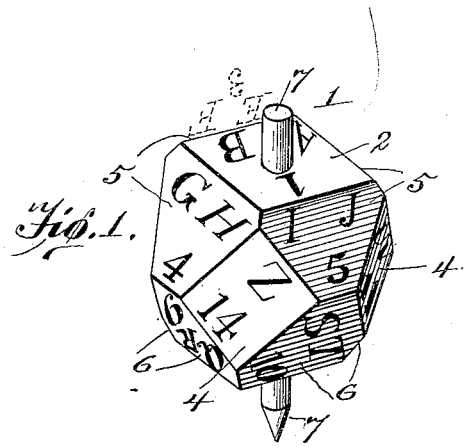
Figure 2:
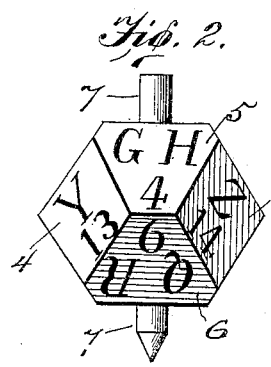
Figure 4:
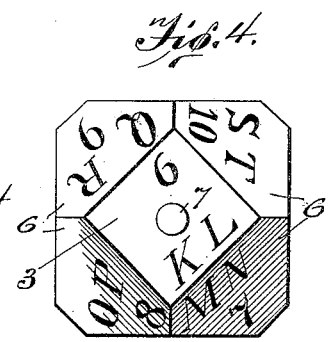
Figure 3:
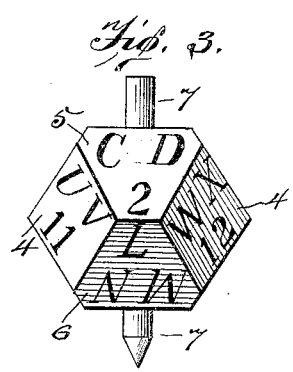

In the accompanying drawings forming part of this application: Figure 1 is a perspective view looking at the top of the block, and having the numeral 3 and letters E—F in dotted lines opposite the surface bearing them. Fig. 2 is a side elevation. Fig. 3 is a similar view looking at the opposite side of the block. Fig. 4 is an elevation looking at the bottom of the block.

The same reference numerals denote the same parts in the figures of the drawings.

The preferred form of my combination toy and educational device consists of a block 1 having a top surface 2, a bottom surface 3 parallel with the surface 2, four square surfaces 4, four upper wedge shaped surfaces 5, a like number of lower wedge shaped surfaces 6, and a stem 7 extending centrally through the block and projecting from the top and bottom surfaces. This arrangement constitutes a top having a multiple of surfaces at an angle one to another.

The numerals 1 and 6 appear on the top and bottom surfaces respectively, numerals 2 to 5 appear on the surfaces 5, numerals 7 to 10 are borne by the surfaces 6, and the square surfaces 4 have thereon numerals 11 to 14. The letters of the alphabet are distributed throughout the surfaces 2 to 6, two letters of the alphabet appearing on each surface except two thereof which bear the letters Y and Z respectively.

It will be observed that in the arrangement of the letters and numerals, the highest numeral (14) appears on the same surface with the letter Z, and that the numerals and letters start or commence on the top surface of the block.

It is obvious that when the block is spinning it presents a novel and attractive appearance as a toy, and that when it is at rest it must lie on one of the various surfaces leaving the remaining surfaces exposed to view. In this latter position as well as when held by the stem, the block may be employed for educational purposes.

Having thus described my invention what I claim as new and desire to secure by Letters Patent is:—

An educational spinning block having a square top and a square bottom, a series of squares around the central circumference of the block, a series of wedge-shaped upper faces intervening between the squares, a series of wedge-shaped lower faces intervening between the said squares, the wedge-shaped upper and lower faces having common edges in the central circumference of the block between the squares, letters and numerals on each of the squares and on each of said faces, and a spinning stem extending through the block, substantially as shown and described.

In witness whereof I hereunto set my hand in the presence of two witnesses.

ORLANDOW S. PERKINS.

Witnesses:
 ANNA P. HANFF,
 ALFRED D. WARD.